(12) United States Patent
Fertenbaugh

(10) Patent No.: US 10,442,124 B2
(45) Date of Patent: Oct. 15, 2019

(54) MOLD FOR AN INJECTION MOLDING MACHINE

(71) Applicant: TYCO ELECTRONICS CORPORATION, Berwyn, PA (US)

(72) Inventor: William L. Fertenbaugh, Camp Hill, PA (US)

(73) Assignee: TE Connectivity Corporation, Berwyn, PA (US)

(*) Notice: Subject to any disclaimer, the term of this patent is extended or adjusted under 35 U.S.C. 154(b) by 191 days.

(21) Appl. No.: 15/276,313

(22) Filed: Sep. 26, 2016

(65) Prior Publication Data

US 2018/0085982 A1  Mar. 29, 2018

(51) Int. Cl.
| | |
|---|---|
| *B29C 45/26* | (2006.01) |
| *B29C 45/17* | (2006.01) |
| *B29L 31/00* | (2006.01) |
| *B29C 33/30* | (2006.01) |

(52) U.S. Cl.
CPC ........ *B29C 45/2606* (2013.01); *B29C 33/303* (2013.01); *B29C 45/1743* (2013.01); *B29C 45/1744* (2013.01); *B29L 2031/757* (2013.01)

(58) Field of Classification Search
CPC . B29C 45/1743; B29C 45/1744; B29C 45/26; B29C 33/30; B29C 33/303; B29C 45/2606
See application file for complete search history.

(56) References Cited

U.S. PATENT DOCUMENTS

| | | | | |
|---|---|---|---|---|
| 4,348,165 | A | * | 9/1982 | Vostrovsky .......... B23Q 1/0063 425/185 |
| 5,112,214 | A | * | 5/1992 | Glatt, Jr. ............. B29C 45/1742 425/472 |
| 5,620,718 | A | * | 4/1997 | Bohm ................ B29C 45/1743 425/190 |
| 9,221,203 | B2 | * | 12/2015 | Cerniglia ............ B29C 45/1761 |

FOREIGN PATENT DOCUMENTS

DE           29 47 938      *  6/1981

* cited by examiner

*Primary Examiner* — James P Mackey

(57) ABSTRACT

A mold for use with an injection molding machine includes a body having a surface and a ring protruding from the surface for aligning the body and a platen. The ring defines a right circular cylinder having a protruding end, the protruding end having subtracted therefrom a generally wedge-shaped portion, the protruding end forming a tapered end.

5 Claims, 5 Drawing Sheets

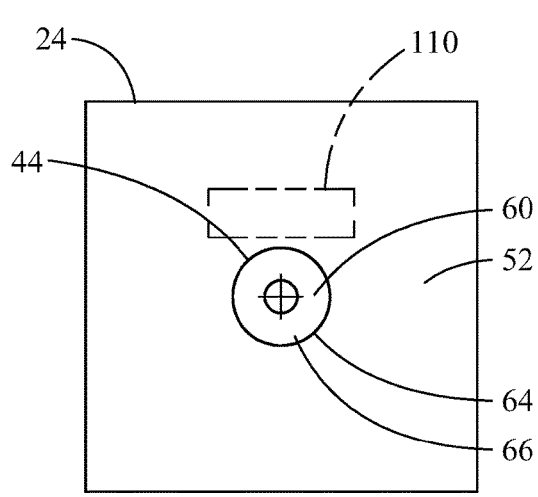 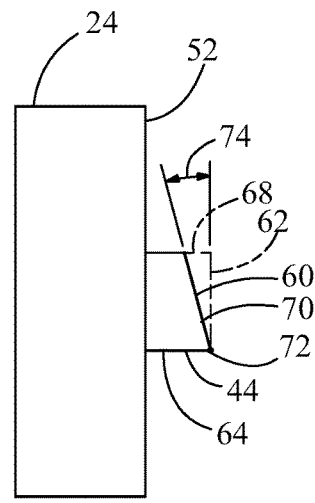
FIG. 3  FIG. 4
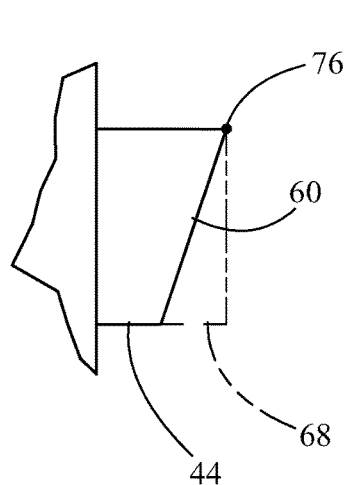 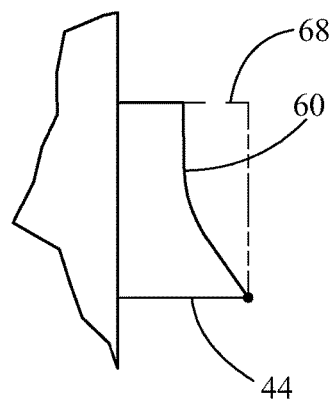
FIG. 5  FIG. 6

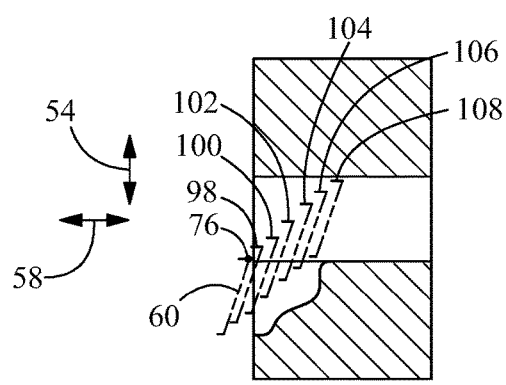
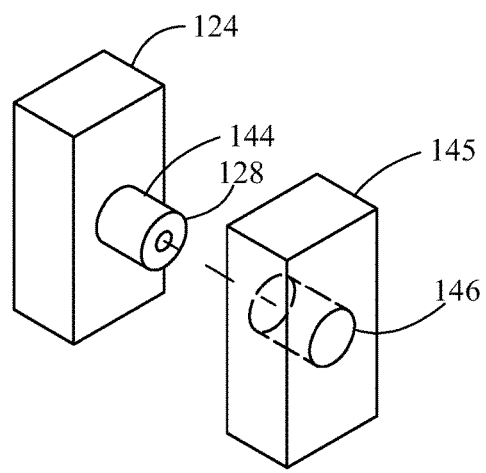
FIG. 8  FIG. 11
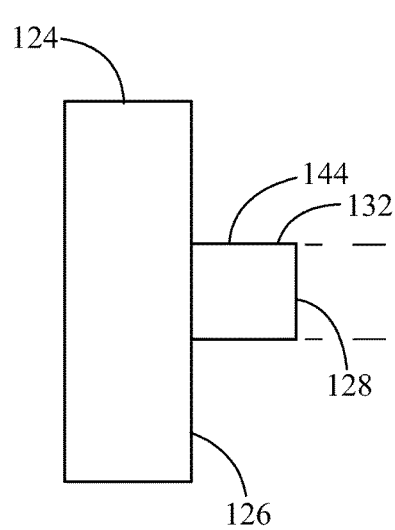
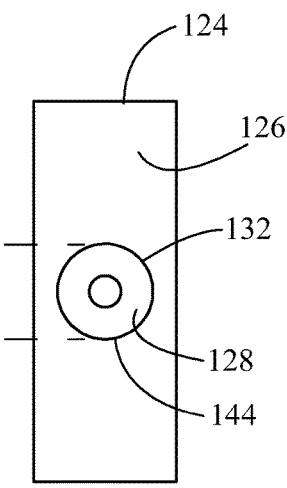
FIG. 9
Prior Art
FIG. 10
Prior Art

MOLD FOR AN INJECTION MOLDING MACHINE

FIELD OF THE INVENTION

The present invention is directed to injection molding machines. In particular, the invention is directed to a mold having a locating ring configured for improved assembly with a platen.

BACKGROUND OF THE INVENTION

Injection molding machines are utilized to manufacture articles for use in many applications. In one example of an injection molding machine, a mold having opposed halves and in a closed position is injected with pressurized material in a plastic state that conforms to the mold cavity. After curing in the mold, the newly formed articles are ejected after the mold halves are separated from each other. The mold is then placed in a closed position and the process is repeated.

Molds are typically extremely heavy and bulky, and not surprisingly, are difficult to install in an injection molding machine. The mold, which is generally suspended from a crane, must be brought into alignment with a mating feature of the platen. Since the mating features provide small amounts of clearance, precise alignment of the mold and the platen is required. Unfortunately, such alignment typically requires numerous adjustments in both vertical and horizontal directions, and is time-consuming and frustrating.

It would, therefore, be highly beneficial to simplify the installation of molds in injection molding machines.

SUMMARY OF THE INVENTION

An embodiment is directed to a mold for use with an injection molding machine including a body having a surface, and a ring protruding from the surface for aligning the body and a platen, the ring including a tapered end. In response to the tapered end of the ring of the mold being positioned in partial alignment with an opening of the platen such that at least a portion of the tapered end is inserted inside of the opening, and a continuous force applied to the mold toward the opening, and the tapered ring being incrementally moved toward a center of the opening, the tapered end guiding the ring into full engagement with the opening.

A further embodiment is directed to a mold for use with an injection molding machine including a body having a surface and a ring protruding from the surface for aligning the body and a platen. The ring defines a right circular cylinder having a protruding end, the protruding end having subtracted therefrom a generally wedge-shaped portion, the protruding end forming a tapered end.

A yet further embodiment is directed to a method of assembling an injection molding machine including providing a platen and a mold, the platen having an opening for receiving a ring protruding from the mold for aligning the platen and the mold, the ring defining a right circular cylinder having a protruding end, the protruding end having subtracted therefrom a generally wedge-shaped portion, the protruding end forming a tapered end. The method further includes aligning the mold ring with the platen opening such that the tapered end is at least partially inserted into the platen opening and continuously applying a force to maintain contact between the tapered end and the platen opening. The method further includes moving the mold relative to the platen such that the mold ring is moved toward a center of the platen opening, thereby permitting the tapered end of the mold ring to guide the mold ring into full engagement with the platen opening.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 3 is a front view of the mold of FIG. 2 of the present invention.

FIG. 4 is a side view of the mold of FIG. 2 of the present invention.

FIG. 5 is a side view of an exemplary mold of the present invention.

FIG. 6 is a side view of an exemplary mold of the present invention.

FIG. 8 is a cross-section view of the platen taken along line 7-7 of FIG. 2 showing incremental engagement with a ring of an exemplary mold of the present invention.

FIG. 9 is a prior art side view of a mold and a locating ring.

FIG. 10 is a prior art front view of the mold and locating ring of FIG. 9.

FIG. 11 is an exploded top perspective view of a prior art mold and platen.

DETAILED DESCRIPTION OF THE INVENTION

The description of illustrative embodiments according to principles of the present invention is intended to be read in connection with the accompanying drawings, which are to be considered part of the entire written description. Terms such as "attached," "affixed," "connected," "coupled," "interconnected," "engaged," "installed" and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features; the scope of the invention being defined by the claims appended hereto.

Figure 1:
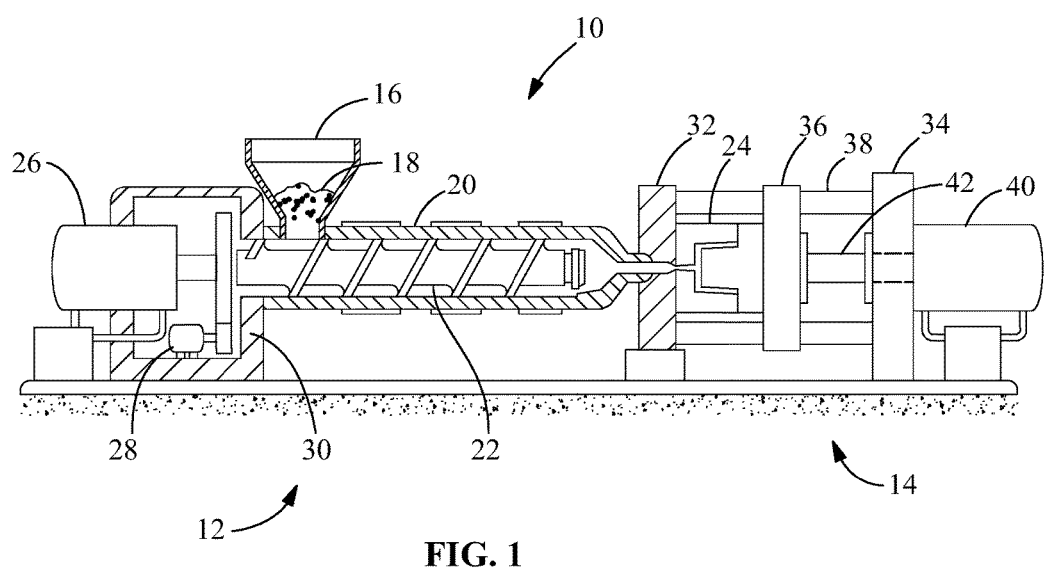
FIG. 1 is a schematic view of an exemplary injection molding machine of the present invention.

FIG. 1 is a schematic representation of an exemplary injection molding machine 10. Injection molding machine 10 includes an injection unit 12 and a clamping unit 14. Injection unit 12 includes a hopper 16 for receiving a material 18 into a barrel 20 having a reciprocating screw 22 for conveying material 18 into a mold 24. A hydraulic cylinder 26 selectively laterally moves reciprocating screw 22 relative to barrel 20, and a motor 28 and associated gears 30 rotatably drive the reciprocating screw to force material 18 into mold 24. Clamping unit 14 includes a movable platen 36 positioned between stationary platens 32, 34.

Movable platen 36 is slidably movable along tie rods 38 extending between platens 32, 34. A hydraulic motor 40 drives a rod 42 for laterally compressively positioning mold 24 between platens 32, 36. Once mold 24 has been laterally compressively positioned between platens 32, 36, pressurized plastic state material 18 can then be provided through barrel 20, platen 32 and then into mold 24.

Figure 2:
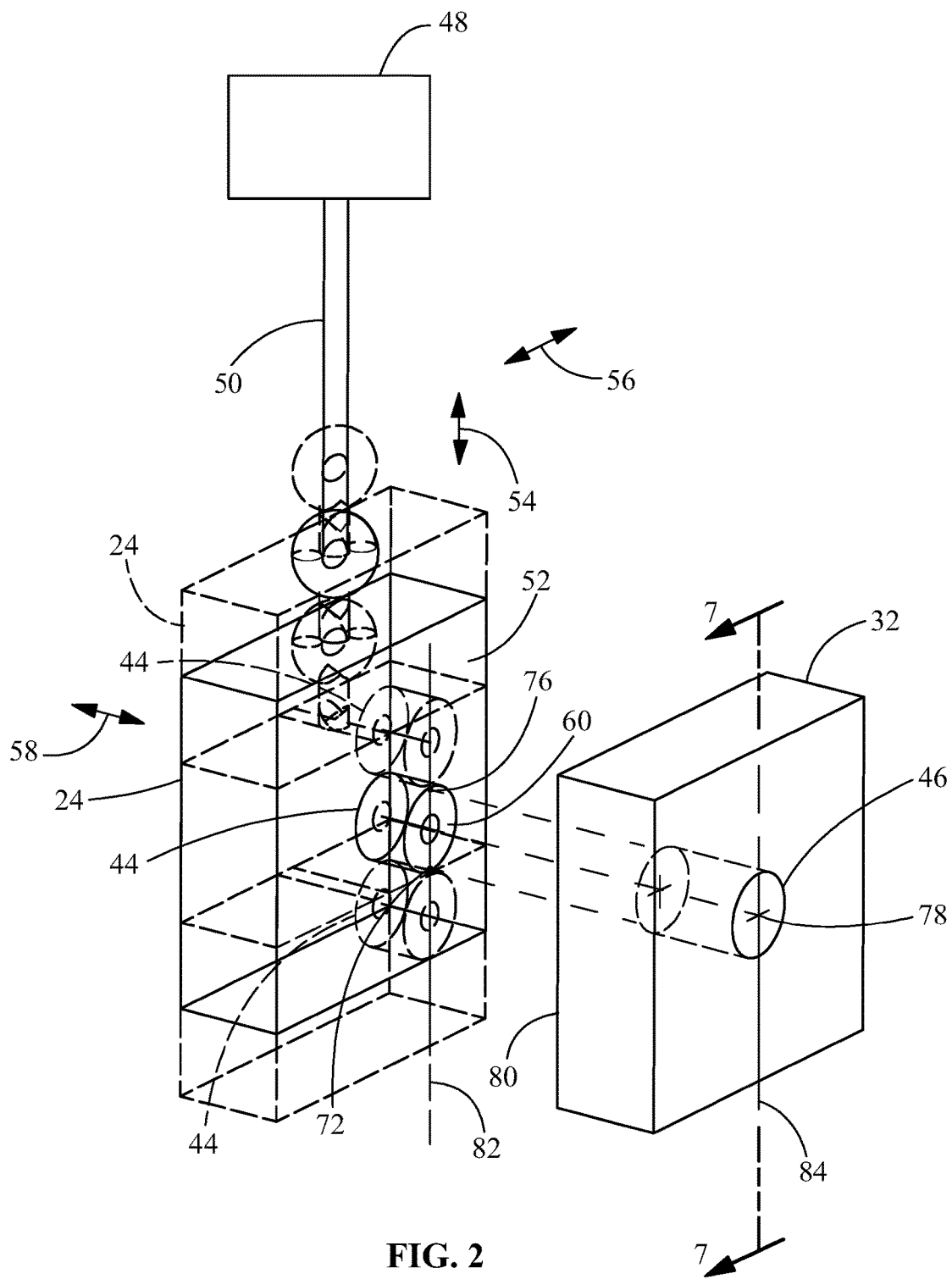
FIG. 2 is an exploded top perspective view of an exemplary mold and platen of the present invention.

As shown in FIG. 2, prior to operating injection molding machine 10 (FIG. 1), mold 24 must first be installed or engagingly secured to platen 32. Installation of mold 24 involves aligning a ring 44 of mold 24, commonly referred to in the art as a locating ring, with an opening 46 of platen 32. Mold 24 is suspended from a cable 50 deployed/retracted from a crane 48 for selectively controlling movement in a vertical direction 54. Selective horizontal positioning of mold 24 can be provided by selectively moving crane 48 in a horizontal direction 56. Prior to the novel improvement to the ring of the mold, which is explained in additional detail below, aligning the mold ring with the opening of the platen was a cumbersome, time-consuming process often involving multiple iterations of vertical and horizontal adjustments of the mold in order to achieve alignment of the ring of the mold with the opening of the platen in order to install the mold. Once mold 24 has been installed, a tip of barrel 20 (FIG. 1) is inserted in one end of opening 46 of platen 32 and ring 44 of mold 24 is inserted in the other opening of opening 46. As a result of this connection, pressurized plastic state material 18 (FIG. 1) from barrel 20 (FIG. 1) can flow into and through opening 46 of platen 32 and then through ring 44 and into a cavity formed in mold 24 to form an injection molded article.

As shown in FIGS. 9 and 10, a prior art mold 124 includes a surface 126 from which a ring 144 extends perpendicularly outward therefrom, terminating at an end having a planar surface 128. Ring 144 defines a right circular cylinder, i.e., a solid bounded by two parallel planar surfaces 126, 128 and by a cylindrical surface 130 consisting of the straight lines (not shown) perpendicular to planar surfaces 126, 128 and passing through a circle 132 (FIG. 10). As further shown in FIG. 11, in order to install mold 124 in an injection molding machine, ring 144 must be inserted inside of opening 146 of platen 145. Due to the small amount of clearance between ring 144 and opening 146, precise alignment of the mold and the platen is required, and moreover, the periphery of end planar surface 128 must simultaneously slide into opening 146. Unfortunately, such alignment typically requires numerous adjustments in both vertical and horizontal directions, and is time-consuming and frustrating.

FIGS. 3 and 4 show a novel tapered end 60 incorporated into ring 44 of mold 24 for greatly simplifying an installation of mold 24 in an injection molding machine 10 (FIG. 1). Mold 24 includes a planar surface 52 from which a ring 44 extends or protrudes perpendicularly outward therefrom, terminating at a tapered end 60. Ring 44 defines a right circular cylinder, i.e., a solid bounded by two parallel planar surfaces 52, 62 (FIG. 4) and by a cylindrical surface 64 consisting of the straight lines (not shown) perpendicular to planar surfaces 52, 62 and passing through a circle 66 (FIG. 3) from which is subtracted a generally wedge-shaped portion 68. As further shown in FIG. 4, wedge-shaped portion 68 is defined by a plane 70 that is coincident with a region 72 of ring 44 that is positioned at or near the periphery of ring 44, which plane 70 subtending an angle 74 with planar surface 62. As further shown in FIG. 4, region 72 of tapered end 60 extends furthermost from planar surface 62. Stated another way, plane 70 (FIG. 4) defines tapered end 60. In one embodiment, such as shown in FIG. 4, region 72 of ring 44 is positioned at or near a vertically lowermost portion of the ring.

Optionally, as shown in FIG. 3 indicia 110, such as "TOP" or other mold orienting information can be provided on surface 52 of mold 24.

In one embodiment, such as shown in FIG. 5, a region 76 of ring 44 is positioned at or near a vertically uppermost portion of the ring. As further shown in FIG. 5, region 76 of tapered end 60 extends furthermost from planar surface 62. In another embodiment, the region of ring 44 that is coincident with plane 70 (FIG. 4) of a corresponding wedge-shaped portion can be oriented in a position that is neither at nor near a vertically uppermost portion of the ring nor at or near a vertically lowermost portion of the ring. In other words, the region of ring 44 coincident with a plane corresponding to a wedge-shaped portion can be located at or oriented in any position at or adjacent to a peripheral surface of the ring. Stated another way, plane 70 can be rotated to any position about a center axis of ring 44 to form a wedge-shaped portion at any orientation.

In one embodiment, angle 74 (FIG. 4) is about 5 degrees. In other embodiments, angle 74 can be any acute angle that is different than 5 degrees, so long as the resulting tapered end of the mold can be fully inserted inside the respective opening of the platen.

It is to be understood that while plane 70 is disclosed in FIG. 4 as defining tapered end 60, the present invention is not intended to be so limiting. For example, as shown in FIG. 6, at least a portion of tapered end 60 can have a curved surface.

Figure 7:
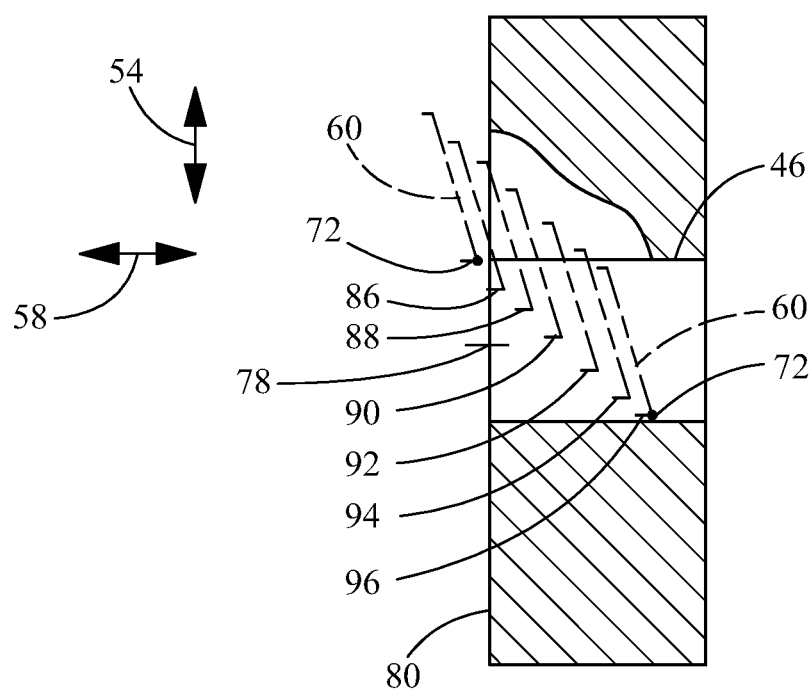
FIG. 7 is a cross-section view of the platen taken along line 7-7 of FIG. 2 showing incremental engagement with a ring of an exemplary mold of the present invention.

FIGS. 2 and 7 show an exemplary mold 24 being installed, secured to or engaged with an exemplary platen 32. First, mold 24, which is suspendedly supported by crane 48 and cable 50, is brought into proximity with platen 32 such that ring 44 of mold 24 faces a surface 80 of platen 32. Mold 24 is brought into proximity with plate 32 via a combination of movements in respective vertical and horizontal directions 54, 56, 58 by crane 48, resulting in ring 44 of mold 24 being positioned in partial alignment with opening 46 of platen 32 such that at least a portion of tapered end 60, such as region 72 (FIG. 7) is inserted inside of the opening 46 at a position 86 (FIG. 7). As shown in FIG. 7, region 72 is at a lowermost portion of ring 44. A continuous force is applied to the mold toward opening 46 in horizontal direction 58, and ring 44 is incrementally moved toward the center 78 of opening 46, resulting in the tapered end 60 guiding ring 44 into engagement, and eventually full engagement with opening 46, such as fully inserted or fully engaged position 96 (FIG. 7).

That is, in one embodiment, such as shown in FIG. 2, in preparation of engaging mold 24 and platen 32, a center axis 82 of ring 44 is laterally aligned with a center axis 84 of opening 46 as a result of movement in horizontal direction 56 by crane 48. Additionally, region 72 of ring 44 is generally vertically aligned with opening 46 in vertical direction 54 by crane 48, such that in combination with sufficient movement of ring 44 in horizontal direction 58, region 72 of ring 44 is partially inserted inside of opening 46, such as represented by position 86 (FIG. 7). Preferably by sufficient movement of crane 48 in horizontal direction 58 toward platen 32, the center of gravity of mold 24 is similarly moved toward platen 32, resulting in a continuous force being applied to the mold toward the platen for maintaining contact between partially inserted tapered end 60 of ring 44 inside of opening 46 of platen 32. In response to ring 44 of mold 24 being incrementally moved in vertical direction 54 toward center 78 (FIG. 2) of opening 46, ring 44 is sequentially guided by tapered end 60 into partial engagement or partially inserted positions 88, 90, 92, 94 (FIG. 7) inside of opening 46. By virtue of continuous force in horizontal direction 58 toward platen 32, ring 44 is urged into full engagement or fully inserted position 96 (FIG. 7) inside of opening 46, permitting operation of the injection molding machine.

Alternately, if tapered end 60 is oriented such as shown in FIG. 5, in which region 76 is positioned at an uppermost portion of ring 44, in preparation of engaging mold 24 and platen 32, as shown in FIGS. 2 and 8, a center axis 82 of ring 44 is laterally aligned with a center axis 84 of opening 46 as a result of movement in horizontal direction 56 by crane 48. Additionally, region 76 of ring 44 is generally vertically aligned with opening 46 in vertical direction 54 by crane 48, such that in combination with sufficient movement of ring 44 in horizontal direction 58, region 76 of ring 44 is partially inserted inside of opening 46, such as represented by position 98 (FIG. 8). Preferably by sufficient movement of crane 48 in horizontal direction 58 toward platen 32, the center of gravity of mold 24 is similarly moved toward platen 32, resulting in a continuous force being applied to the mold toward the platen for maintaining contact between partially inserted tapered end 60 of ring 44 inside of opening 46 of platen 32. In response to ring 44 of mold 24 being incrementally moved in vertical direction 54 toward center 78 (FIG. 2) of opening 46, ring 44 is sequentially guided by tapered end 60 into partial engagement or partially inserted positions 98, 100, 102, 104, 106 (FIG. 8). By virtue of a continuous force in horizontal direction 58 toward platen 32, ring 44 is urged into full engagement in opening 46, or position 108 (FIG. 8), permitting operation of the injection molding machine.

By virtue of regions 72, 76 of tapered end 60 being oriented in a vertical direction, the force of gravity acting on mold 24 provides sufficient vertical alignment between tapered end 60 of mold 24 and opening 46 of platen 32 such that tapered end 60 guides ring 44 into full engagement in or inside of opening 46 without further adjustment in a non-vertical direction of the mold relative to the platen, simplifying and decreasing installation time of the mold, resulting in increased operational efficiency of the injection molding machine. In one embodiment, the regions can be oriented in a non-vertical arrangement, but may require adjustment in a non-vertical direction of the mold relative to the platen.

While the invention has been described with reference to a preferred embodiment, it will be understood by those skilled in the art that various changes may be made and equivalents may be substituted for elements thereof without departing from the spirit and scope of the invention of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A mold for use with an injection molding machine comprising:
   a body having a surface;
   a ring protruding outward from the surface for aligning the body and a platen, the ring including a tapered end; wherein the ring defines a right circular cylinder bounded by a body planar surface and a parallel plane spaced from the body planar surface, the ring having a protruding end, the protruding end having subtracted therefrom a generally wedge-shaped portion forming said tapered end and the tapered end having a first region extending furthermost from the surface of said body, the wedge-shaped portion defined by an angled plane which is coincident with the first region of the tapered end of the ring, the first region positioned at a periphery of the ring, the angled plane extending from the first region to a second region positioned at the periphery of the ring, the angled plane subtending at an acute angle from the spaced parallel plane;
   wherein in response to the tapered end of the ring of the mold being positioned in partial alignment with an opening of the platen such that at least a portion of the tapered end is inserted inside of the opening, and a continuous force applied to the mold toward the opening, and the tapered ring being incrementally moved toward a center of the opening, the tapered end guiding the ring into full engagement with the opening.

2. The mold of claim 1, wherein the ring is configured such that the entire tapered end is insertable inside of the opening.

3. The mold of claim 1, wherein the tapered end has a planar surface.

4. The mold of claim 1, wherein at least a portion of the tapered end has a curved surface.

5. The mold of claim 1, wherein the region is positioned at one of an uppermost portion and a lowermost portion of the tapered end;
   wherein in response to the tapered end of the ring of the mold being positioned in partial alignment with the opening of the platen such that at least a portion of the tapered end is inserted inside of the opening, and a continuous force applied to the mold toward the opening, and the tapered ring being incrementally moved vertically toward the center of the opening, the tapered end guiding the ring into engagement with the opening.

* * * * *